Dec. 7, 1948.  A. W. MEYER  2,455,871
ADJUSTABLE DRILL JIG
Filed Feb. 10, 1945  3 Sheets-Sheet 2

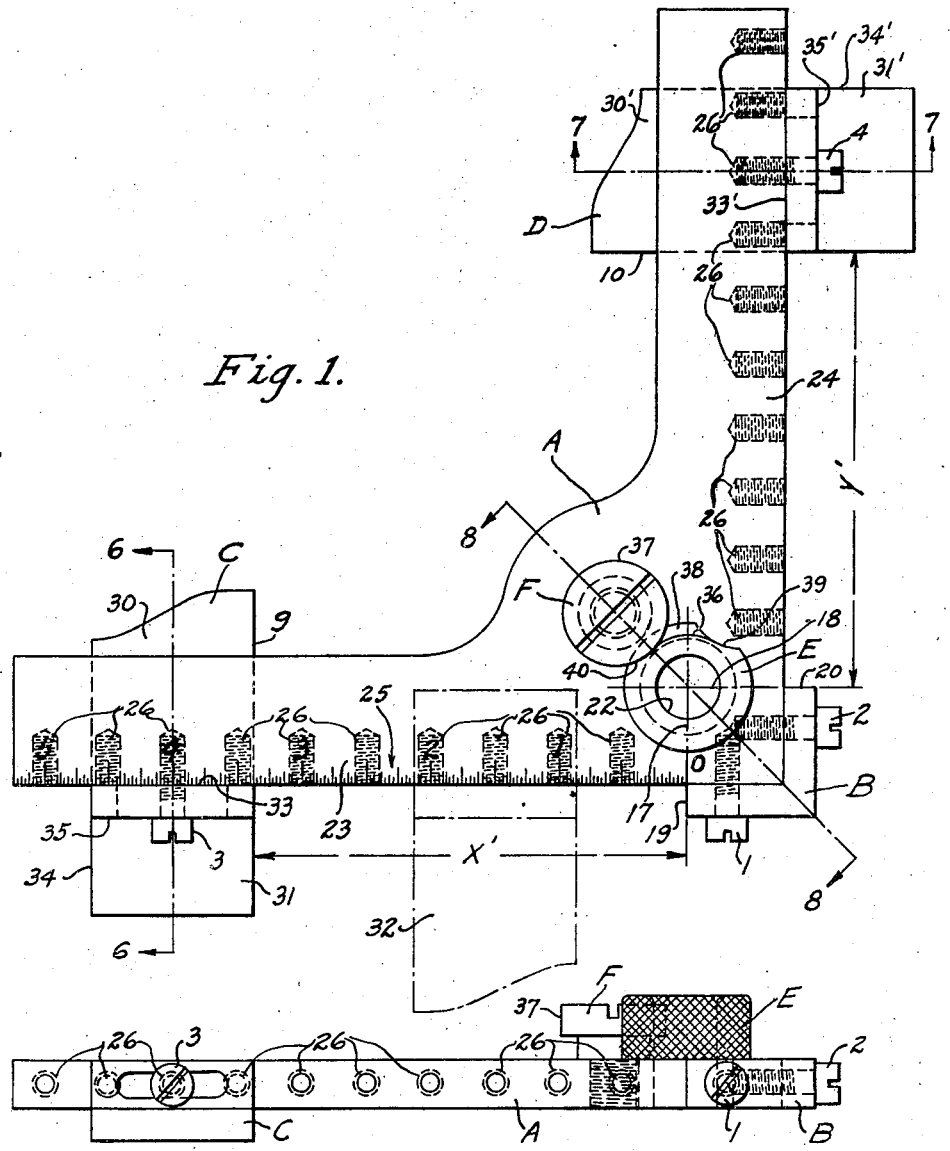

INVENTOR
Arthur W. Meyer

Dec. 7, 1948.  A. W. MEYER  2,455,871
ADJUSTABLE DRILL JIG
Filed Feb. 10, 1945  3 Sheets-Sheet 3
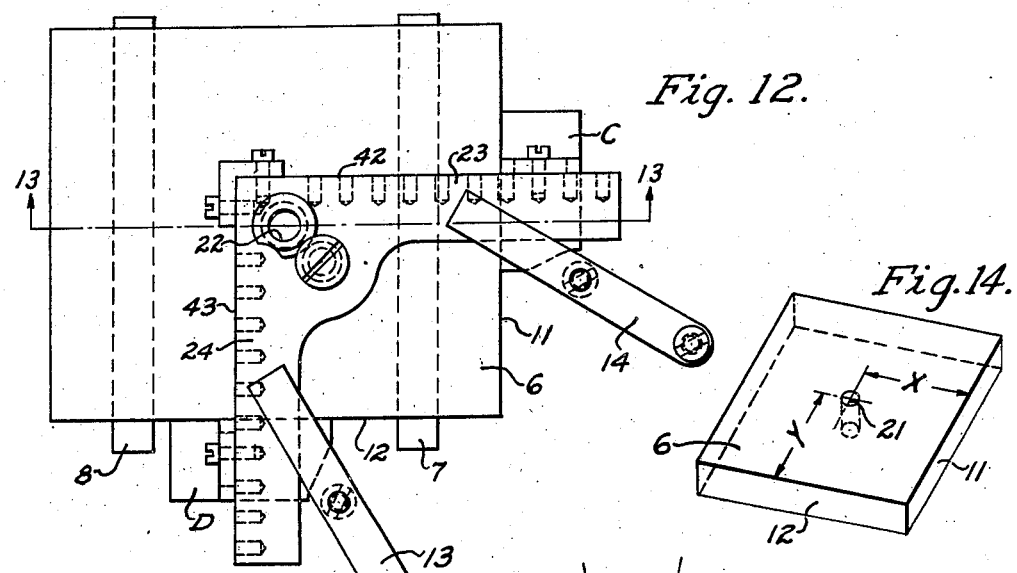
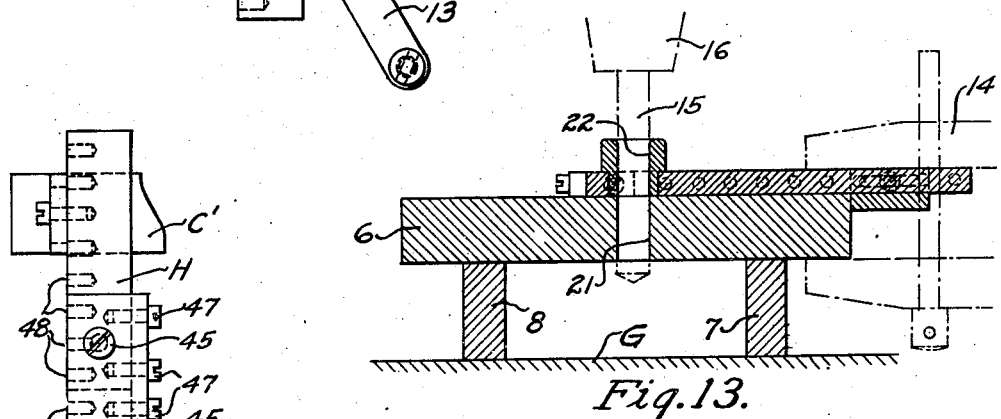
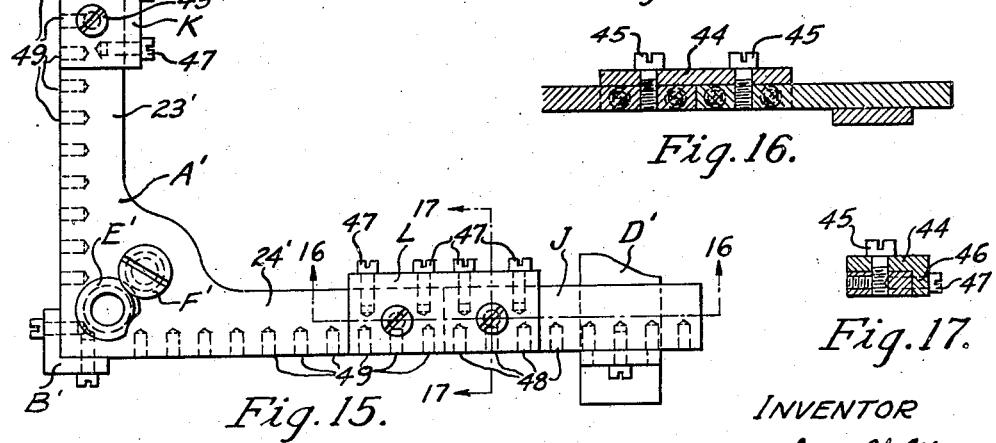
INVENTOR
Arthur W Meyer Patented Dec. 7, 1948

2,455,871

UNITED STATES PATENT OFFICE 2,455,871

ADJUSTABLE DRILL JIG

Arthur W. Meyer, St. Louis, Mo., assignor of one-half to Joseph P. Happley, St. Louis, Mo.

Application February 10, 1945, Serial No. 577,265

4 Claims. (Cl. 77—62)

The invention relates to drilling appliances for locating and then drilling holes in articles or devices requiring the use of drills or similar cutting tools which rotate while cutting. More particularly, the invention relates to tools or appliances for locating and drilling holes in die parts, fixtures, jigs, or other tools which are to be used in the mass production of other articles or devices.

One method previously used in locating and then drilling holes in an article such as a die part, fixture part, or jig part is to scribe guide lines on such parts for the drilling operation by using a mechanics height gauge, but this has a disadvantage in that after the lines are scribed on the work there is no guide other than the scribed lines to locate the drill in position on the work, and after the hole is drilled, it is likely to be located slightly away from the desired location in the work.

Another method previously used in drilling holes in an article was to place the article on a jig boring machine and then set and adjust the machine so that the article was positioned under the drill in the proper location for drilling. This method provided a more accurate drilling operation than the method described in the preceding paragraph, but a considerable amount of adjusting and setting was required which was objectionable because it takes more time for the complete drilling operation. Furthermore, the jig boring machine is an expensive tool and if, due to its initial cost, only one such machine is provided in a shop, there may be a considerable loss of time when two or more mechanics wish to use the machine at the same time.

The main object of the present invention is to provide a simple tool or jig requiring less skill than that required heretofore with other tools for accurately drilling and reaming a hole in an article or device, and further to provide one which can be quickly adjusted and applied to the article or work and as soon as applied be ready for the drilling operation. A still further object of the present invention is to provide such a tool or jig which will be inexpensive and which will be adapted for the individual use of a mechanic whereby very little or no time will be lost by a mechanic in drilling holes in a work piece which otherwise would be the case if he were required to wait his turn to use some other tool or machine in the shop to do the drilling and reaming.

Another object of the invention is to provide a tool or jig of this type which can be quickly adjusted by using gauge blocks, such as for instance, the well known Johansson blocks, for accurately positioning the adjusting parts on the tool or jig.

Another object of the invention is to provide a tool or jig of this type which has a guide thereon to direct the drill or reamer into the work, such as for instance, a removable bushing having a hole the same size as the drill or reamer. A further object is to construct and arrange the tool so that it can be clamped in position on the work with the bushing applied and then, with the tool clamped on the work, such assembly laid on the table of the drilling machine ready for the drilling operation with or without parallel bars or other supporting means between the work and table.

Another object is to provide a tool or jig of this type in which the drill guide or bushing can be quickly applied or removed, whereby guides or bushings having different size holes can be quickly interchanged if desired. This object may readily be attained if a set of standard size bushings is used in connection with the jig. A further object is to provide means on the tool or jig whereby the bushing cannot turn with the cutting tool or be removed vertically during the cutting operation. This is accomplished by providing an element or screw on the jig which is arranged to interlock with a portion of the bushing in a manner to limit the amount of turning and vertical movements of the bushing as will be described in detail later.

A still further object is to provide a tool or jig of this type which may be made of a desired size for the regular work in a shop, but which is arranged so that extension parts can be added if it is to be used on work larger than the regular work and a larger tool is necessary.

While the present invention is primarily a precision tool, it is a further object to provide a tool or jig of this type which is so arranged that it can easily adapt itself for non-precision work without endangering its further use as a precision tool. This is accomplished by so constructing and arranging the parts that an ordinary scale may be used for non-precision work to position the adjustable parts instead of using gauge blocks as previously mentioned or instead of using some other precision measuring means. This can be further accomplished either by marking the scale on the jig as an integral part thereof or by permanently affixing a separate scale thereto.

These and other detail objects as will appear from the following description are attained by the device illustrated in the accompanying drawings, in which—

Figure 1 is a top view of a complete tool or drill jig including the bushing for guiding the drill.

Figure 2 is a side view of the jig looking toward the bottom portion shown in Figure 1.

Figure 3:
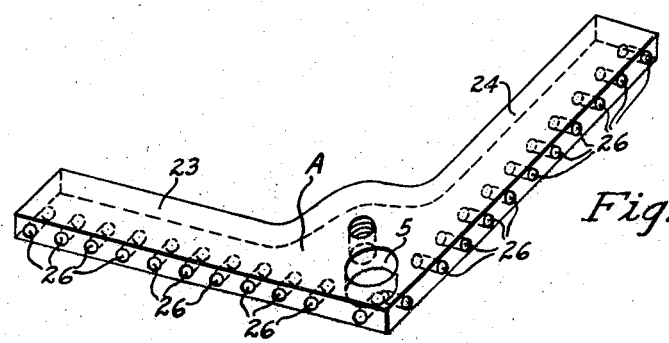
Figure 3 shows the main member or body of the jig in perspective without any other parts mounted thereon and on a reduced scale.
Figure 4:
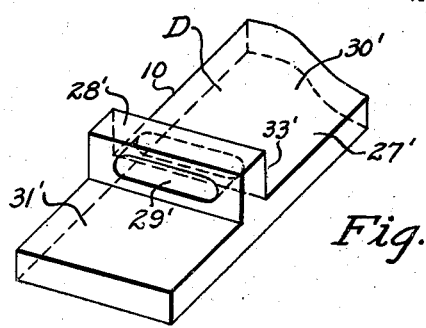
Figure 4 is a perspective view of one of the adjusting blocks indicated at D in Figure 1.
Figure 5:
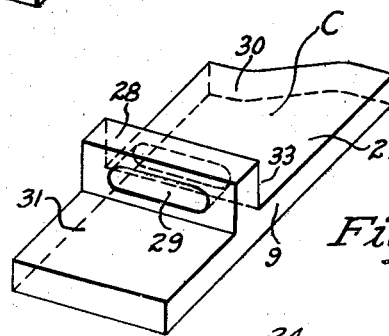
Figure 5 is a perspective view of another adjusting block indicated at C in Figure 1.
Figure 6:
Figure 7:
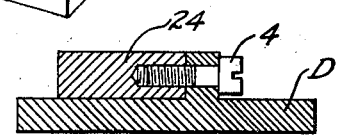
Figure 8:
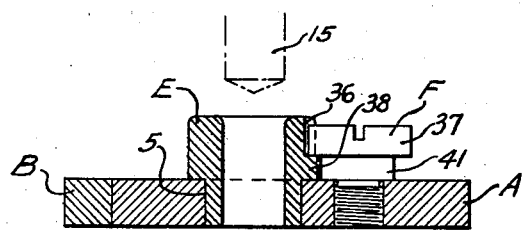

Figures 6, 7, and 8 are cross sectional views of the jig taken on the lines 6—6, 7—7, and 8—8, respectively, of Figure 1.

Figure 9:
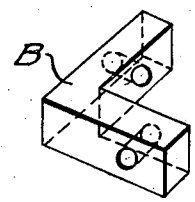

Figure 9 is a perspective view of the corner block indicated at B in Figure 1.

Figure 10:
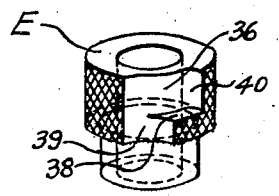

Figure 10 is a perspective view of the drill guide bushing.

Figure 11:
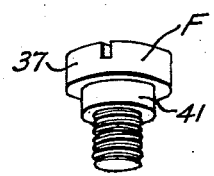

Figure 11 is a perspective view of the screw for locking the drill guide bushing in position on the jig body.

Figure 12 is a top view on a reduced scale, showing a complete jig clamped in position on an article to be drilled.

Figure 13 is a sectional view through the jig and article also on a reduced scale and taken on line 13—13 of Figure 12.

Figure 14 is a perspective view on a reduced scale of an article or work piece which has been drilled by means of the drill jig illustrated in the previous figures.

Figure 15 illustrates a drill jig, on a reduced scale, of the type shown in Figure 1 but with extension parts at the outer ends of the legs of the body member.

Figures 16 and 17 are cross sectional views, also on a reduced scale, of the drill jig shown in Figure 15 and taken on lines 16—16 and 17—17, respectively, of Figure 15.

The invention with its several parts shown in assembled relation in Figures 1 and 2, with its parts shown individually in Figures 3, 4, 5, 9, 10, and 11, and with certain parts shown in section in Figures 6, 7, and 8 comprises a body member A, a corner block B secured to the body member by means of screws 1 and 2, adjusting blocks C and D which are held in any desired adjusted position on the body member by means of screws 3 and 4, respectively, a guide bushing E fitted in a hole 5 in the body member A, and the screw F for locking the bushing E in position on the body member A.

Other details of the invention will be described after first describing its use as a drill jig for which it is particularly adapted.

With bushing E applied as illustrated in Figures 1, 2, and 8, the invention is particularly adapted for drilling and reaming holes in an article having two straight side faces forming an angle of 90°. Such an article is illustrated in Figure 14 and may comprise a block 6 of steel forming a die part in which one or more holes are to be drilled at certain distances from the side faces 11 and 12 of the block 6 as indicated by the dimension lines X and Y, but it is to be understood that the invention, which will hereafter be called an "adjustable drill jig" or simply a "drill jig" may be used for drilling holes similarly in other articles which have a substantially flat top face and at least two straight side faces or surfaces forming an angle of 90°, such as for instance, other parts of jigs or fixtures ordinarily used in the production of still other articles or devices. When used in this manner it becomes a handy tool adapted for individual use by a toolmaker or other mechanic in a tool or machine shop. It is also to be understood that the drill jig is adapted for use on articles made of other metals or on articles made of other materials such as wood, plastic, etc.

Figures 12 and 13 illustrate the manner in which the drill jig is used to drill a hole accurately in an article 6 of the type shown in Figure 14 in which the faces 11 and 12 form an angle of 90° between them. To drill a hole in block 6, predetermined distances X and Y from faces 11 and 12 respectively, it is first necessary that adjustments be made on the drill jig so that the adjusting blocks C and D are securely clamped on the body A at distances X′ and Y′, respectively, spaced from the opposing end faces 19 and 20, respectively, of block B, as indicated in Figure 1, the distances X′ and Y′ corresponding to the distances X and Y, respectively, in Figure 14. The blocks C and D are securely held in position on the body A by means of screws 3 and 4, respectively. A bushing E having a guide hole 22 corresponding in size to the size of the drill or reamer to be used is also placed in position on the body A of the drill jig and locked in position by means of screw F. After these adjustments have been made and bushing E applied to the drill jig, the assembled drill jig is then placed on article 6 so that the faces 9 and 10 on the adjustable blocks C and D, respectively, fully abut the faces 11 and 12 of article 6, respectively. The drill jig is then clamped securely on the article 6 by means of parallel clamps 13 and 14. This assembly comprising the drill jig with its several parts, the article 6, and the clamps 13 and 14, is then placed on parallel bars 7 and 8 on the table G of the drill press. The article 6 is then ready for the drilling operation. The drill 15 and the chuck 16 on the spindle of the drilling machine are indicated in dot-dash lines in Figure 13. The article 6 with the drill jig clamped thereon is moved by hand in position under drill 15 so that the drill 15 will be in alignment with the guide hole 22 in bushing E, in which position the latter will guide the drill 15 or hold it in true position during the drilling operation. After drilling, the bushing E will then be replaced with a bushing of reamer size and then reamed for greater accuracy.

It will readily be seen that if additional holes are to be drilled in the article or work piece in different locations, the same procedure may be followed for each hole by readjustment of blocks C and D and substitution of other bushings E having the proper size guide holes therein.

A very high degree of accuracy as to the size and location of the hole to be drilled in an article may be obtained by using this type of drill jig. The degree of accuracy is determined by the means used for adjusting or positioning the blocks C and D on the drill jig. A very accurate and simple method of positioning blocks C and D on the body A of the drill jig is as follows: To position block C, a set of gauge blocks, such as for instance the well known Johansson blocks, is first assembled so that the overall dimension of the gauge block assembly corresponds to the predetermined dimension X indicated in Figure 14. This gauge block assembly is then inserted between the respective opposing faces 9 and 19 of blocks C and B. The adjusting block C is then moved in position on body A so that it abuts the adjacent end of the gauge block assembly while the other end of the gauge block assembly abuts the adjacent face of block B. The block C is then tightly secured to body A by means of screw 3, and the gauge block assembly removed. The dimension X' in Figure 1 will then correspond to the desired dimension X in Figure 14. Block D is positioned in the same manner and tightly secured to the body A by means of screw 4 so that dimension Y' in Figure 1 corresponds to the desired dimension Y in Figure 14.

As indicated in Figure 1 by means of dot-dash lines 17 and 18, the end faces 19 and 20 of block B are in exact alignment with the centers of holes 5 and 22 in the body A and bushing E, respectively. Thus, when the adjusting blocks C and D are positioned predetermined distances X' and Y', respectively, Figure 1, from the respective opposing faces 19 and 20 of block B with the drill jig clamped on the article 6, as shown in Figure 12, the hole 21 can then be drilled in article 6 to the location indicated by dimension lines X and Y, Figure 14, which will correspond exactly with dimension lines X' and Y' in Figure 1.

Various other means of adjusting or positioning blocks C and D on body A of the drill jig may be used depending on the degree of accuracy desired. One other method is to use an inside caliper with the ends of its legs set the desired distance apart so that the outside dimension of the caliper at the ends of its legs correspond to the desired dimension X', Figure 1, for positioning block C, and then using the caliper to position and then clamp the block C on body A. The block D may then be positioned and clamped on body A in the same manner. Another method, which is less accurate, is simply to use an ordinary scale to measure off the desired distances X' and Y'.

If desired, another less accurate but very quick and simple method is to provide a permanent scale on each leg 23 and 24 of the body member A of the drill jig. Such a scale is indicated at 25, Figure 1, on leg 23 of body member A, and it will be understood leg 24 can be provided with a like scale, it being omitted on leg 24 in Figure 1 for the sake of convenience since the drill jig may or may not be provided with scales depending upon the manner in which the drill jig is used. If the drill jig is used for very accurate work only, the scales are not required because it is necessary to use a more accurate method such as previously described. Scales, such as indicated at 25, may be provided on the legs 23 and 24 by etching or cutting the lines and figures thereon or by any well known method. When such scales are provided on legs 23 and 24 of the body member A and great accuracy is not required in the drilling of the article, it can readily be seen that the blocks C and D can be quickly positioned to the desired dimensions X' and Y', respectively, without using gauge blocks, calipers, separate scales, or other separate measuring means.

Scales, such as indicated at 25 in Figure 1, may be utilized in conjunction with the other previously mentioned methods of positioning blocks C and D, including the method of using gauge blocks for great accuracy. When so utilized, they comprise a guide or check to show that the adjustment is at least approximately accurate. In other words, if adjusting block C is to be spaced say exactly 2.245 inches from the opposing end face 19 of block B and gauge blocks are used to accurately make the adjustment, then scale 25 will show whether or not the overall dimension of the gauge block assembly corresponds closely to the proper dimension. However, if the scale 25 indicates that the overall dimension of the gauge black assembly is say 2½ inches or 2⅛ inches, then the mechanic would know at a glance that the gauge block assembly is not accurate and that it must be corrected before it is used to clamp the adjusting block C on the leg 23 of the body member A.

The body member A of the drill jig is provided with a series of equally spaced threaded holes 26 in each of the outer side faces of its legs 23 and 24 so that adjusting blocks C and D can be clamped on the respective legs 23 and 24 of the body member in any desired position. The block C consists of a main flat member 27, Figure 5, with an angular projection 28 provided on its upper face. An elongated slot 29 is provided in projection 28 to accommodate screw 3 for securely clamping the block C on the body member with screw 3 screwed in one of the threaded holes 26. The slot 29 has a length slightly greater than the diameter of the body of the screw 4 plus the distance between two adjacent holes 26. Thus it will readily be seen that the block C can be clamped in any desired position on leg 23 of the body member. A portion 30 of the flat member 27 of block C extends under the leg 23 when in position thereon and when the dimension X', Figure 1, is greater than the length of portion 30 measured from the projecton 28. However, when the dimension X' is to be less than the length of portion 30, then the block C is placed on leg 23 so that the portion 31 of the flat member 27 extends under the leg 23 instead of portion 30, as indicatd at 32 by the dot-dash lines representing the block C in another position on the leg 23. This placing of block C on leg 23 in the manner shown at 32 will provide for positioning the block C on leg 23 at smaller distances from block B than would be possible when portion 30 extends under leg 23. Thus there will be no interference between both blocks C and D if both are to be positioned short distances from the respective faces 19 and 20 of block B. Block D consists of a flat member 27', a projection 28', an elongated slot 29', and portions 30' and 31', all corresponding to respective elements 27, 28, 29, 30, and 31 of block C, and it can readily be seen that it can also be clamped in any desired position on leg 24 of the body member.

The faces 9 and 33 on block C and corresponding faces 10 and 33' on block D are at an angle of 90° to each other so that when blocks C and D are clamped on legs 23 and 24, respectively, of body member A, the faces 9 and 10 will be at an angle of 90° with each other and with the outer side faces of legs 23 and 24, respectively. Likewise, the faces 34 and 35 of block C and faces 34' and 35' of block D are at an angle of 90° to each other so that when blocks C and D are clamped on legs 23 and 24, respectively, in a manner as shown at 32, the faces 34 and 34' will be at an angle of 90° with each other and with the outer side faces of legs 23 and 24, respectively. Thus with blocks C and D clamped in predetermined positions X' and Y', respectively, on the body member A, with the drill jig clamped on the article as shown in Figure 12, the hole 21 can be drilled and reamed very accurately in the article as to size and location therein. When the blocks C and D are clamped in position on the body member A, it is important, if very accurate work is to be done, that the outer side surfaces of the legs 23 and 24, which are engaged by the surfaces 33 and 33' of the projections 28 and 28' of blocks C and D, respectively, have very accurate 90° angular or square relation to each other and further that surfaces 9 and 33 and surfaces 34 and 35 on block C and corresponding surfaces on block D also have very accurate 90° angular or square relation to each other. When these parts are made accurately, then due to the fact that the surfaces 33 and 33' are clamped directly to the side surfaces of legs 23 and 24, respectively, by screws 3 and 4 passing through projections 28 and 28', respectively, the surfaces 9 and 10 will be exactly at 90° angular relation. This will also be the case with respect to surfaces 34 and 34' when surfaces 35 and 35' of blocks C and D are clamped against the side surfaces of legs 23 and 24, respectively. It will be noted that surfaces 9, 10, 34, and 34' are extended in the same plane to form the end faces of the projections 28 and 28' of blocks C and D, respectively, and this extension provides measuring surfaces which are located at the same level as the opposing measuring surfaces 19 and 20 of block B.

As indicated in Figure 8, the bushing E is locked in position on body A by means of the shouldered screw F. The bushing E has a portion cut away forming a recess 36 to accommodate the head 37 of screw F. The recess thus formed provides a flange 38 extending under the head 37 to prevent removal of the bushing vertically when in its proper assembled position in body A. A portion of flange 38 is also cut away forming another recess 39, and when the bushing is turned so that the recess 39 is in alignment with the head 37 of screw F, the bushing can be applied to the body A or removed from it very quickly in a vertical direction. It can readily be seen that after a hole has been drilled, the drill size bushing can be replaced very quickly with a reamer size bushing without unclamping the drill jig from the article. The bushing can also be replaced very quickly with another bushing having a different size hole if the jig is to be readjusted and another hole is to be drilled in the same article.

Since the drill or reamer will rotate in a clockwise direction, the bushing E cannot turn with the drill or reamer because the portion 40 of the bushing at one end of the recess 36 will strike the head 37 of screw F as indicated in Figure 1. The arrangement provides for the application or removal of a bushing E without loosening or removing screw F. The screw F is provided with a shoulder 41 which is slightly higher than the height of flange 38 on the bushing E so that the bushing is free to turn from an unlocked position to a locked position or vice versa.

The drill jig shown in Figures 15, 16, and 17 comprises a body member A', a corner block B', a bushing E', a screw F', and adjusting blocks C' and D', each part similar to those shown in Figures 1 to 11. The drill jig includes, however, extension members H and J at the ends of legs 23' and 24', respectively. The extension members are secured to the legs 23' and 24' by means of splices K and L, respectively. Each splice is provided with a top plate 44 (see Figures 16 and 17) which is fastened to the abutting end portion of the corresponding leg of the body A' and the corresponding end portion of the extension members H or J by means of screws 45. This insures perfect alignment of the parts with the top surfaces of the adjacent leg and extension member. Each splice is also provided with a downwardly extending side projection 46 (see Figure 17) fastened to the inner side faces of the end portion of the corresponding leg of the body A' and the inner side face of the adjacent end portion of the corresponding extension member with screws 47. This insures perfect alignment of the outer side faces of the adjacent leg and extension member. Since the splices K and L are fastened against the top and inner side surfaces of the legs of body A' and the extensions H and J, respectively, the adjusting blocks C' and D' may be adjusted in any desired position along the legs of the jig either on the main body portion of the jig or the corresponding extension member, and if positioned abreast the splices there will be no interference between the splices and the adjusting blocks. The extensions H and J may be of any desired length. They provide a means whereby the jig may be used for larger work than that for which it would ordinarily be used. It is to be understood that, if desired, the jig could be made with the extension members integral and of any desired length that would be practical, but separate extension members may be preferred so that the jig, if used mainly on comparatively small work, could be handled more advantageously on small work with shorter legs as would be the case when the extensions are removed. The extensions are also provided with threaded holes 48, similar to the threaded holes 26 in the jig shown in Figure 1, for positioning and clamping the blocks C' and D' thereon, and the holes 48 are spaced apart so as to agree with the spacing of the threaded holes 49 on body member A'.

It will be understood that the details of construction of the drill jig may be varied other than as shown without departing from the spirit of the invention and the exclusive use of those modifications coming within the scope of the claims is contemplated.

What is claimed is:

1. A tool of the class described comprising the combination of a body member adapted to be mounted on top of a work piece, a non-adjustable measuring element, an adjustable measuring element, and clamping means for said adjustable measuring element, said body member including two legs intersecting each other at one of their ends and diverging from their intersection at an angle of 90° to each other, said body member having an aperture located adjacent to the intersection of said legs for receiving a guide for a rotatable cutting device and positioning the latter immovably in said body member in a plane extending transversely to the axis of rotation of the cutting device, said non-adjustable element being positioned on the outer side of a leg of said body member and having a surface extending lengthwise of the axis of said aperture and at 90° to the side surface of the leg and outwardly therefrom, said adjustable element being mounted on the same leg on which said non-adjustable element is positioned and having a horizontal portion adapted to engage the underside of the leg and an upwardly projecting portion engaging the outer side surface of the leg, said latter portion having a surface extending outwardly at 90° from the outer side surface of the leg and facing toward the above-mentioned surface of said non-adjustable element, said horizontal portion having a surface extending in the same direction as the above-mentioned surface on said upwardly projecting portion for engagement with a side surface of the work piece, and said clamping means holding said upwardly extending portion of said adjustable element directly to the leg of the body member to position said latter element on the leg in spaced relation with said non-adjustable element.

2. A tool of the class described in claim 1 comprising a combination including a non-adjustable element, an adjustable element, and clamping means for the latter element of the same type described in claim 1 for each leg of the body member.

3. A tool of the class described comprising the combination of a body member adapted to be mounted on top of a work piece, a non-adjustable measuring element, an adjustable measuring element, and clamping means for said adjustable measuring element, said body member including two legs intersecting each other at one of their ends and diverging from their intersection at an angle of 90° to each other, said body member having an aperture located adjacent to the intersection of said legs for receiving a guide for a rotatable cutting device and positioning the latter immovably in said body member in a plane extending transversely to the axis of rotation of the cutting device, at least one of said legs having a series of spaced holes in the outer side thereof extending in the lengthwise direction of the leg, said non-adjustable element being positioned on the outer side of the leg of said member having said series of holes and having a surface extending lengthwise of the axis of said aperture and at 90° to the side surface of the leg and outwardly therefrom, said adjustable element being mounted on the same leg on which said non-adjustable element is positioned and having a horizontal portion adapted to engage the underside of the leg and an upwardly projecting portion engaging the outer side surface of the leg, said latter portion having a surface extending outwardly at 90° from the outer side surface of the leg and facing toward the above-mentioned surface of said non-adjustable element, and also having an elongated slot to accommodate said clamping means, said slot having an overall length greater than the overall spacing of any two adjacent holes in said series of holes, said horizontal portion having a surface extending in the same direction as the above-mentioned surface on said upwardly projecting portion for engagement with a side surface of the work piece, and said clamping means holding said upwardly extending portion of said adjustable element directly to the leg of the body member and extending through said slot to position said latter element on the leg in spaced relation with said non-adjustable element.

4. A tool of the class described in claim 3 comprising a combination including a non-adjustable element, an adjustable element, a clamping means, and a series of holes of the same type described in claim 3 for each leg of the body member.

ARTHUR W. MEYER.

REFERENCES CITED

The following references are of record in the file of this patent:

UNITED STATES PATENTS

| Number | Name | Date |
| --- | --- | --- |
| 683,664 | Schramek et al. | Oct. 1, 1901 |
| 1,293,009 | Blaustein | Feb. 4, 1919 |
| 1,392,734 | Aldeen | Oct. 4, 1921 |
| 1,408,098 | Knapp et al. | Feb. 28, 1922 |
| 1,871,178 | Hudson | Aug. 9, 1932 |
| 2,124,118 | Okerfelt | July 19, 1938 |
| 2,166,692 | Ray | July 18, 1939 |
| 2,242,792 | Panzer | May 20, 1941 |
| 2,273,954 | Grass | Feb. 24, 1942 |
| 2,341,107 | MacDonald | Feb. 8, 1944 |
| 2,342,033 | Barabas | Feb. 15, 1944 |